(12) United States Patent
Backus et al.

(10) Patent No.: US 7,242,520 B2
(45) Date of Patent: Jul. 10, 2007

(54) METHOD FOR OPTIMIZING OUTPUT IN ULTRASHORT-PULSE MULTIPASS LASER AMPLIFIERS WITH SELECTIVE USE OF A SPECTRAL FILTER

(75) Inventors: Sterling J. Backus, Erie, CO (US); Henry C. Kapteyn, Boulder, CO (US)

(73) Assignee: The Regents of the University of Colorado, Boulder, CO (US)

( * ) Notice: Subject to any disclaimer, the term of this patent is extended or adjusted under 35 U.S.C. 154(b) by 0 days.

(21) Appl. No.: 11/501,206

(22) Filed: Aug. 8, 2006

(65) Prior Publication Data

US 2007/0030559 A1    Feb. 8, 2007

Related U.S. Application Data

(60) Provisional application No. 60/706,389, filed on Aug. 8, 2005.

(51) Int. Cl.
*H01S 3/00* (2006.01)
(52) U.S. Cl. .................................................. 359/347
(58) Field of Classification Search ............. 359/347, 359/337.2; 372/25, 30, 32
See application file for complete search history.

(56) References Cited

U.S. PATENT DOCUMENTS 5,615,043 A * 3/1997 Plaessmann et al. ........ 359/346
5,644,424 A * 7/1997 Backus et al. .............. 359/347
6,700,698 B1 * 3/2004 Scott .......................... 359/347
6,804,287 B2  10/2004 Backus et al.

OTHER PUBLICATIONS

Backus, S. et al., High-Efficiency, Single-Stage 7-kHz High-Average-Power Ultrafast Laser System, Optics Letters, Apr. 2001, pp. 465-467, vol. 26, No. 7.
Zeek, E. et al., Adaptive Pulse Compression for Transform-Limited 15-fs High-Energy Pulse Generation, Optics Letters, Apr. 2000, pp. 587-589, vol. 25, No. 8.
Barty, C.P.J. et al., Generation of 18-fs, Multiterawatt Pulses by Regenerative Pulse Shaping and Chirped-Pulse Amplification, Optics Letters, May 1996, pp. 668-670, vol. 21, No. 9.
Cheng, Z. et al., Compression of 2 mJ Kilohertz Laser Pulse to 17.5 fs by Pairing Double-Prism Compressor: Analysis and Performance, Optics Communications, Jan. 2002, pp. 145-155, vol. 201.
Takada, H. et al., Broadband Regenerative Amplifier Using a Gain-Narrowing Compensator with Multiple Dielectric Layers, Japanese Journal of Applied Physics, Oct. 2004, pp. L1485-L1487, vol. 43, No. 11B.

(Continued)

*Primary Examiner*—Mark Hellner
(74) *Attorney, Agent, or Firm*—Macheledt Bales & Heidmiller, LLP; Jennifer L. Bales

(57) ABSTRACT

A method for optimizing multipass laser amplifier output utilizes a spectral filter in early passes but not in later passes. The pulses shift position slightly for each pass through the amplifier, and the filter is placed such that early passes intersect the filter while later passes bypass it. The filter position may be adjust offline in order to adjust the number of passes in each category. The filter may be optimized for use in a cryogenic amplifier.

19 Claims, 5 Drawing Sheets

OTHER PUBLICATIONS

Barty, C.P.J. et al., Renegerative Pulse Shaping and Amplification of Ultrabroadband Optical Pulses, Optics Letters, Feb. 1996, pp. 219-221, vol. 21, No. 3.

Hentschel M. et al., Generation of 0.1-TW Optical Pulses with a Single-Stage Ti:Sapphire Amplifier at a 1-kHz Repetition Rate, Applied Physics B, May 2000, pp. S161-S164, vol. 70, Supplemental.

Seres, J. et al., Sub-10-fs, Terawatt-Scale Ti:Sapphire Laser System, Optics Letters, Oct. 2003, pp. 1832-1834, vol. 28, No. 19.

* cited by examiner

US 7,242,520 B2

METHOD FOR OPTIMIZING OUTPUT IN ULTRASHORT-PULSE MULTIPASS LASER AMPLIFIERS WITH SELECTIVE USE OF A SPECTRAL FILTER

This application claims the benefit of U.S. Provisional Patent Application No. 60/706,389, filed Aug. 8, 2005.

GOVERNMENT SUPPORT

The present invention was made with government support as follows, and the U.S. government has certain rights in the invention.

National Science Foundation (NSF), PHY-0096822, "Group Research in Atomic, Molecular and Optical Physics at JILA", Carl Wieman PI.

Department of Energy National Nuclear Security Agency, DE-FG03-02NA00063, "Coherent imaging of laser-plasma interactions using XUV high harmonic radiation", Henry Kapteyn PI.

National Science Foundation (NSF), Major Research Instrumentation grant, ECS-0216205, "Development of a high-average power ultrafast laser", Margaret Murnane PI.

BACKGROUND OF THE INVENTION

1. Field of the Invention

This invention relates to methods of optimizing laser amplifier output. In particular, this invention relates to optimizing laser amplifier output in ultrashort-pulse multipass laser amplifiers, by selective use of a spectral filter.

2. Description of Related Art

Gain narrowing has long been recognized as a problem in amplifiers where the beam passes through the amplifying medium multiple times (e.g. multipass configurations and regenerative configurations). Both multipass and regenerative amplifiers pass the beam being amplified through the gain material a number of times, in order to achieve sufficient amplification. Since gain follows a generally bell-shaped curve, the repeated passes result not just in increased power, but also in narrowed gain profile.

Gain-flattening etalons and other types of filters have been used in the past in room temperature regenerative [4] and multipass amplifiers [3, 5]. The resulting gain shape achieved is not ideal however, as it is not flat but rather a double peak shape or "hard edges" on the spectrum. See, for example, FIG. 4 in reference [6], wherein the double peak has completely suppressed the gain at 800 nm, the center frequency of the input pulse.

This non-ideal effect of the etalon or filter is minor in early passes, because the gain is high and offsets the "double peak" effect of the filter. In later passes, when amplifier is near saturation, the double peak effect predominates. Furthermore, the amount of gain the amplifier can achieve is degraded by use of a filter in these last few passes when the power is the highest. Such filters work best in small signal regimes. However, no prior work in the field discusses the insertion of such a filter in earlier passes but not later passes, although it is the case that some laser systems have used two stages of amplification—the first of which did include the filter, and the second of which did not and others [7, 8, 9] have removed the pulse from the amplifier before a final pass through the filter. In others, the position of the filter was such that the pulse was removed from the amplifier after passing through the crystal, but before a final pass through the filter. However, no attempt was made in past work to fabricate and mount the filter in such a way that the number of passes through which the filter is inserted can be varied.

A need remains in the art for a technique of optimizing the output of ultrashort-pulse multipass amplifiers by selectively inserting a spectral filter in the path of the beam being amplified.

BIBLIOGRAPHY

[1] S. Backus, R. Bartels, S. Thompson, R. Dollinger, H. C. Kapteyn, and M. M. Murnane, "High-efficiency, single-stage 7-kHz high-average-power ultrafast laser system," Optics Letters, vol. 26, pp. 465-467, 2001.

[2] S. J. Backus, H. C. Kapteyn, and M. M. Murnane, "Ultrashort pulse amplification in cryogenically cooled amplifiers." U.S. Pat. No. 6,804,287: Regents of the University of Colorado, 2004.

[3] E. Zeek, R. Bartels, M. M. Murnane, H. C. Kapteyn, S. Backus, and G. Vdovin, "Adaptive pulse compression for transform-limited 15-fs high-energy pulse generation," Optics Letters, vol. 25, pp. 587-589, 2000.

[4] C. Barty, T. Guo, C. Le Blanc, F. Raksi, C. Rose-Petruck, J. Squier, K. Wilson, V. Yakovlev, and K. Yamakawa, "Generation of 18-fs, multiterawatt pulses by regenerative pulse shaping and chirped-pulse amplification," Optics Letters, vol. 21, pp. 668-70, 1996.

[5] Z. Cheng, F. Krausz, and C. Spielmann, "Compression of 2 mJ kilohertz laser pulses to 17.5 fs by pairing double-prism compressor: analysis and performance," Optics Communications, vol. 201, pp. 145-155, 2002.

[6] Takada et al., "Broadband Regenerative Amplifier Using a Gain-Narrowing Compensator with Multiple Dielectric Layers," Japanese Journal of Applied Optics, vol. 43, no. 11B, pp. L1485-L1487.

[7] Barty et al., "Regenerative pulse shaping and amplification of ultrabroadband optical pulses," Optics Letters, Vol. 21, No. 3, pp. 219-221.

[8] Hentschel et al., "Generation of 0.1-TW optical pulses with a single-stage Ti:sapphire amplifier at a 1-kHz repetition rate," Appl. Phys. B70 [Suppl.], pp. S161-S164.

[9] Seres et al., "Sub-10-fs, terawatt-scale Ti:sapphire laser system," Optics Letters, Vol. 28, No. 19, pp. 1832-1834.

SUMMARY

It is an object of the present invention to provide a technique of optimizing the output of ultrashort-pulse multipass amplifiers by selectively inserting a spectral filter in the path of the beam being amplified.

This technique is particularly useful in multipass amplifiers, because the path of the beam can be directed to bypass the filter in later passes, rather than moving the filter itself. As a feature, the location of the filter can be adjusted offline in order to select how many passes are intersected by the filter and how many are bypassed. As a feature, the amplifier may be a cryogenically cooled device and the spectral filter a custom-designed designed filter that compensates for the narrowing of gain profile that occurs in cryogenic amplifiers.

The present invention uses a "multipass amplifier" configuration, wherein the pulses do not retrace exactly the same path through the laser crystal for many passes, but rather shift slightly in path with each pass until the final pass intersects a mirror, which removes the pulse from the amplifier for use as an output pulse. The filter is placed such that early passes intersect the filter, while later passes bypass it. Causing the filter to intersect the beam for the first several passes but bypass it for the final several passes increases system gain and improves pulse shape.

The present invention is particularly useful in cryogenic amplifiers, wherein the amplifying laser material is cryogenically cooled. In this case, the gain flattening filter is preferably optimized for pulses amplified by cryogenically cooled material. In some cases the cryogenic temperature may be adjusted slightly, to match the optimized filter.

The present invention finds its immediate usefulness in ultrashort-pulse ti:sapphire laser amplifiers. The typical operating parameters require on the order of 10 passes through the crystal in a multipass amplifier. An ultrafast laser amplifier system takes an ultrashort light pulse, "stretches" it in time, then puts the beam through an amplifier that typically requires 8-20 passes through a laser crystal to increase the pulse energy from ~$10^{-9}$ Joules to ~$10^{-3}$ J or higher and is then recompressed in a pulse compressor.

DETAILED DESCRIPTION

Figure 1:
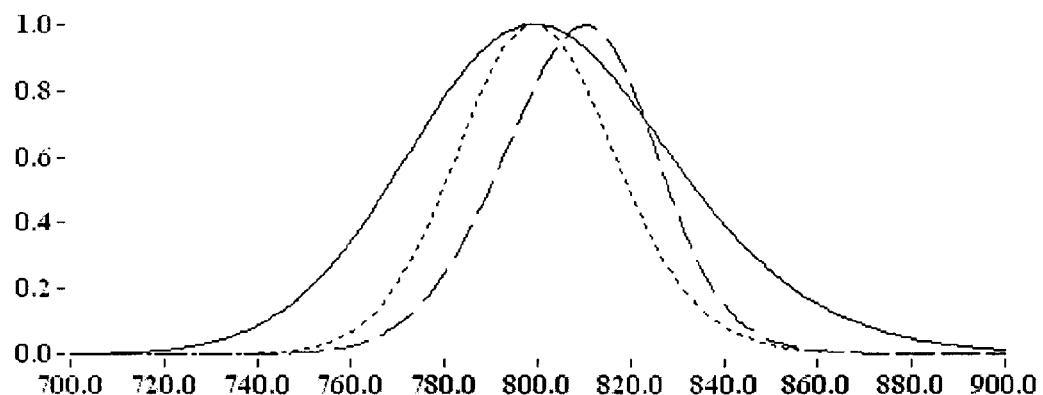
FIG. 1 (Prior Art) is a plot showing the effect of multiple passes of a pulse on pulse spectrum in a ti:sapphire amplifier system without a gain flattening filter.

FIG. 1 (Prior Art) is a plot showing the effect of multiple passes of a pulse on pulse spectrum in a ti:sapphire amplifier system without a gain flattening filter. The plot shows standard gain shaping/narrowing in a Ti:sapphire laser amplifier at room temperature (300 K). The solid curve is the input spectrum from the oscillator, the short dashed line is the spectrum after seven passes in the amplifier, and the long dashed is output spectrum from amplifier, after twelve passes. The spectrum after seven passes exhibits gain narrowing but little spectral pulling because it is not extracting significant energy, yet (it is below saturation), and therefore the red end of the spectrum (temporally the first wavelengths to see the gain as the pulse goes through the gain media) is not "stealing" gain from the blue (trailing) end of the spectrum. The spectrum after 12 passes shows a significant red shift compared with 7 passes, due to the combined action of gain saturation with positive chirp of the pulse. The effect of such a gain saturation effect should ideally be taken into account in design of the gain flattening filter, to optimize the output. The 75 nm spectrum is narrowed to 40 nm FWHM, and pulled 5 nm to the red end of the spectrum, giving a 30 fs pulse assuming no phase distortion. Overall gain is $1\times10^6$.

Figure 2:
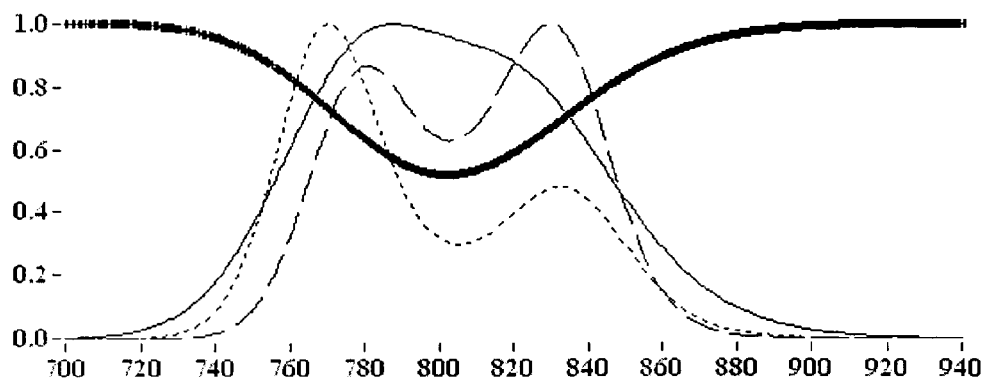
FIG. 2 is a plot illustrating the effect of selective use of a gain flattening filter on pulse spectrum in a ti:sapphire amplifier system.
Figure 3:
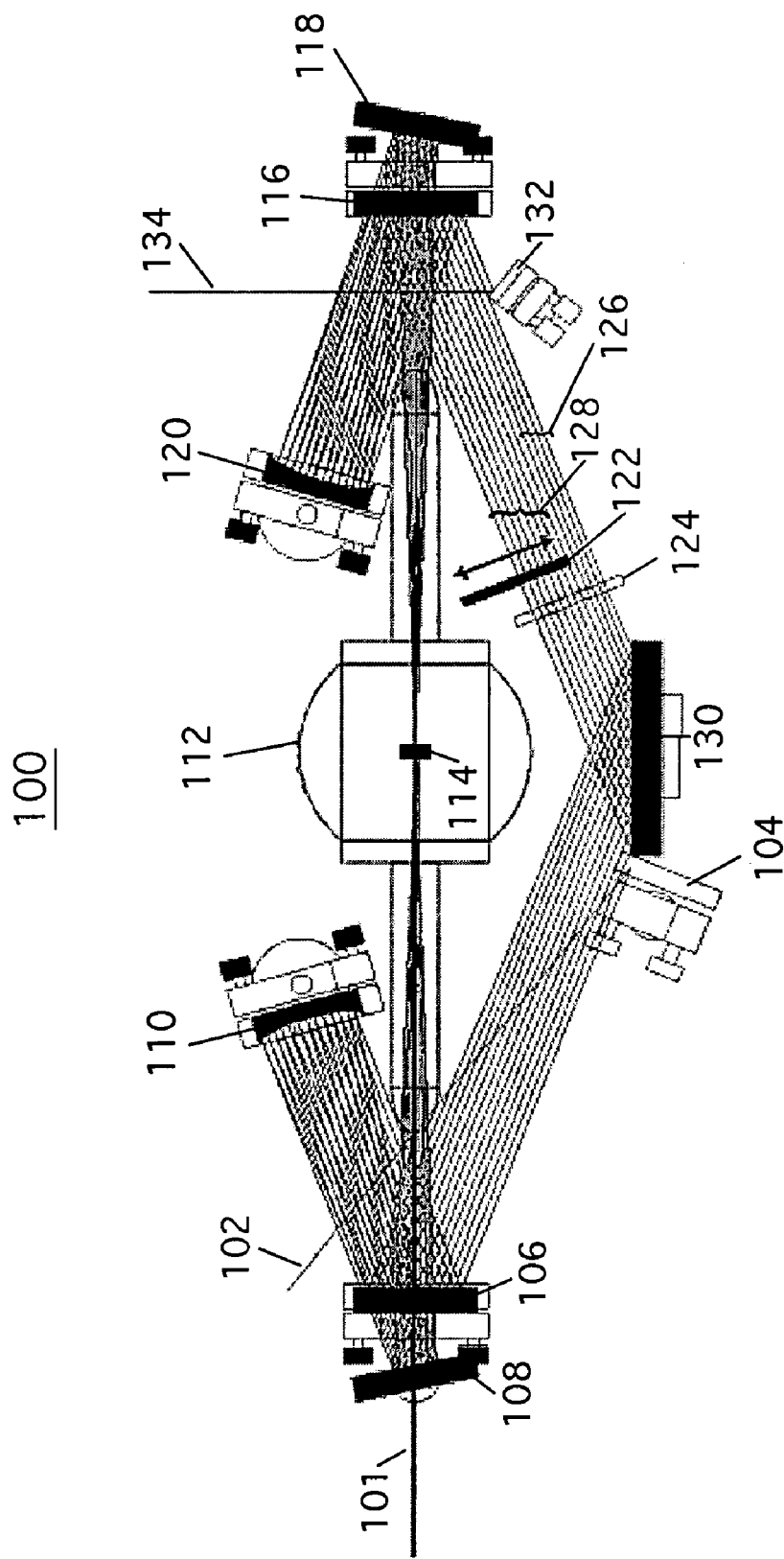
FIG. 3 is a block diagram of a preferred embodiment of an ultrafast ti:sapphire laser amplifier selectively using a gain flattening filter according to the present invention.

FIG. 2 is a plot illustrating the effect of selective use of a gain flattening filter on pulse spectrum in a ti:sapphire amplifier system (see FIG. 3). Gain flattening filter 122 intersects the first seven passes 128 of Ti:sapphire amplifier system 100. The last five passes bypass filter 122. The thick black curve is the filter transmission (ideal) of filter 122, the solid line is the spectrum after the first pass, the short dashed line is the spectrum after the seventh pass, and the long dash is the spectrum of the output pulse 134, after twelve passes (seven intersecting passes 128 and five bypassing passes 126). The output spectrum is 80 nm FWHM that gives a 19 fs pulse assuming no phase distortion.

FIG. 3 is a block diagram of a preferred embodiment of an ultrafast ti:sapphire laser amplifier 100 selectively using a gain flattening filter 122 according to the present invention. The embodiment of FIG. 3 is a cryogenically cooled amplifier, but this is optional. If laser material 114 is cryo cooled (in chamber 112) filter 122 is preferably optimized to operate on the resulting pulses. See FIGS. 4-8.

The embodiment of FIG. 3 is a "multipass" amplifier configuration, wherein the beam shifts slightly in path with each pass, which allows filter 122 to intersect the beam path for a variable number of passes—i.e. it intersects the first several passes 128, but the last several passes 126 bypass the filter. The final pass intersects output mirror 132 and is diverted out of the amplifier as output pulse 134.

Ultrafast laser amplifier system 100 takes an ultrashort light pulse 102, "stretches" it in time, then puts the beam through an amplification process that typically requires 8-20 passes through a laser crystal 114 to increase the output pulse 134 energy from ~$10^{-9}$ Joules to ~$10^{-3}$ J or higher. After amplification, the pulse is typically recompressed in a pulse compressor. Pump beam 101 enters the system at the right in FIG. 3.

Input beam 102 reflects off of flat mirror 104 and into the amplifier. The beam rings around the amplifier as half flat mirrors 106 and 116 send some of the light through the laser material 114, and allow some to reflect off flat mirrors 108 and 118 (and flat mirror 130) and curved mirrors 110 and 120. Optional mask 124 prevents ASE from forming in the amplifier.

In the multipass configuration of FIG. 2, and in similar configurations, there is a region of propagation (between flat mirror 130 and half flat mirror 116 in this embodiment) in the amplifier ring where the beams all travel in parallel, but are displaced from each other horizontally. Spectral filter 122 is mounted in this region such that early passes 128 pass through the filter and later passes 126 bypass it. Filter 122 can be translated (offline) perpendicular to the beam in order to vary the number of passes through the filter. The exact number of passes for which the spectral filter is used can be adjusted to obtain minimum pulse duration while avoiding double peak spectra or other undesirable characteristics, while also maintaining optimum energy extraction from the laser.

The physical reason for having filter 122 intersect only the earlier passes is 1) loss in the gain flattening filter, and 2) gain saturation. The gain-flattening filter is lossy, reflecting some of the light out of the path of the multipass amplifier. This affects the overall efficiency of the amplifier; however, this loss is most significant in the final passes through the amplifier, when the pulse energy is highest. The amount of energy lost from the amplifier with each pass through the filter depends on the spectral shape, but is somewhere in the range of ~20% in the case of the filter design of FIG. 1. With a typical small-signal gain per pass of ~5×, a pulse of $10^{-9}$ Joules energy would be amplified to $5\times10^{-9}$ J after one pass. A loss of 20% in the gain flattening filter would reduce this energy by ~$10^{-9}$ Joules, and the gain to an average of 4×. The energy loss at this point is insignificant. The gain is reduced, and thus a somewhat greater number of passes would be required to obtain a given pulse energy. In the small signal limit, for example, a total small-signal gain of $10^6$ would be obtained in $\log(10^6)/\log(5)$=8-9 passes without the filter, but ~$\log(10^6)/\log(4)$=10 passes with the filter. However, since the net gain (i.e. the product of the gain from the laser crystal, and the loss from the filter) is flat over a broader bandwidth. Thus the amplification process does not narrow the spectrum of the pulse, making it possible to retain the shortest possible pulse duration after the amplification process. In-fact, the gain-flattening filter may cause spectral "gain broadening" rather than gain narrowing, depending on the relative gain and loss.

However, at some point the amplifier pulse energy begins to reach saturation, where the pulse amplification process is extracting a significant fraction of the energy stored in the laser crystal. For example, in our typical configuration we "pump" the ti:sapphire laser crystal with ~10 mJ of absorbed energy, with the pump laser wavelength of 532 nm. The total exactable energy is ~10 mJ*(532 nm)/(800 nm)≈6-7 mJ. Once the pulse has extracted a significant fraction of this stored energy, the gain per pass begins to decrease. If the pulse then also passes through the gain-flattening filter, there are two problems: 1) with a lower overall gain in the laser crystal, the spectral filter overcompensates for the gain curve, making a broad but non-ideal spectral shape; and 2) the loss from the filter becomes significant in terms of overall energy loss from the pulse; i.e. when the pulse has ~5 mJ energy a 20% loss is ~1 mJ, and this loss is unrecoverable since the gain in the amplifier has become depleted.

The optimum solution is to insert the gain flattening filter for the initial passes through the multipass amplifier, while the final passes, once the pulse energy is reaching saturation, do not make use of the filter. In this way, the gain flattening filter can be matched to the small signal gain characteristics of the amplifier, to maintain or moderately broaden the spectrum of the pulse in these initial passes. In passes that are nearing saturation, the spectral filter is not there, and does not result in any loss of pulse energy and amplifier efficiency. Furthermore, some gain-narrowing can serve to spectrally-reshape the "square" pulse spectrum resulting from the initial passes, resulting in a more nearly ideal spectrum (which in the case where a short pulse duration is required, corresponds to a approximately Gaussian-shape spectrum). Changing the number of passes in which the spectral filter is used is simply a matter of translating the spectral filter in the case of FIG. 2, however different schemes for varying the number of passes can be employed, as can different designs of spectral filter (for example, where the spectral filter coating is applied to only part of the substrate, such that all passes travel through the substrate but only some through the filter). Another alternative would be to have different design spectral filters for successive passes. It should also be pointed out that the variable number of passes scheme also allows for a greater manufacturing tolerance in the exact shape of the spectral gain-flattening filter, and in the gain per pass implemented in the setup. Since these filters are difficult to manufacture with an exact depth, shape, and center frequency of modulation, a means of adjusting performance is important for manufacturing consistency. It also allows for the pump pulse energy to be varied over a significant range without needing to change the spectral filter.

Conventional gain flattening filters include a mounting frame that would obscure the beam if someone attempted to use them in this way. In addition, in conventional filters the layer structure does not extend to the edge. Therefore, filter 122 preferably is constructed such that the layer structure (see FIG. 4) extends all the way to at least one edge of the optic, and without a frame at that edge which would block light (for example the filter might be glued to a support at the bottom and the filter structure extend to one side edge, with the beam walking off that side edge.).

Figure 4:
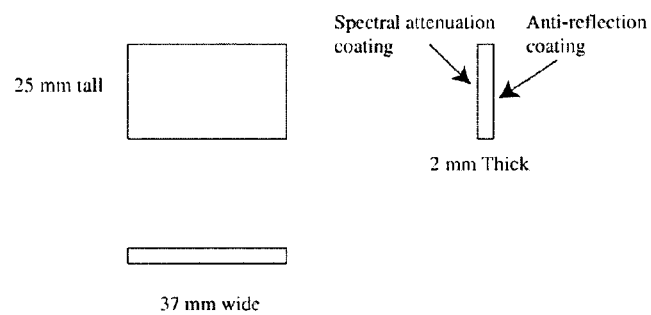
FIG. 4 is a top plan view, a side view, and an end view of an embodiment of a gain-flattening filter according to the present invention.

FIG. 4 illustrates a specially designed spectral "gain flattening" filter 122, optimized specifically for the case of a cryogenically-cooled crystal 114, to maintain spectral bandwidth in the laser amplifier system 100. Although various designs of spectral gain-flattening filters for room temperature ultrafast laser amplifier systems have been discussed and implemented in the past, there has been no discussion of designing a spectral filter specifically for the case of a cryogenically cooled laser amplifier system. Development of this design required careful measurement of the gain spectrum in the specific case of the cryo-cooled system, and then an iterative design process, where gain-flattening filters with various spectral characteristics were fabricated using standard thin-film deposition techniques, put into the laser amplifier and evaluated. Based on these experimental data, the design was modified. The resulting optimum design, in the case for ti:sapphire cooled to cryogenic temperature, corresponds to a spectral filter that transmits 40-50% of the light at the peak attenuation wavelength of 770-785 nm, and a FWHM of the gain-flattening filter of ~75 nm. The exact shape of this gain-flattening filter can be optimized both for the material used, for the temperature at which the laser medium is operating, and also for the gain per pass in the laser crystal for the particular optical amplifier configuration used. This gain-flattening filter was implemented using a transmissive optic, but the filter itself could also be implemented in a reflective mode FIG. 4 is a top plan view 402, a side view 404, and an end view 406 of a gain flattening filter 122. The anti-reflection coating 410 is for broadband light centered around the gain center of the cryo-cooled amplifier (about 770 nm).

The spectral attenuation coating 408 is the gain flattening filter coating design. Coating 408 comprises 9 layers each of $SiO_2$, and $HfO_2$, whose thickness is about ¼ wavelength, or about 200 nm, but is numerically optimized to match the desired transmission curve. $SiO_2$, and $TiO_2$ may alternatively be used, but at a reduced damage threshold.

Figure 5:
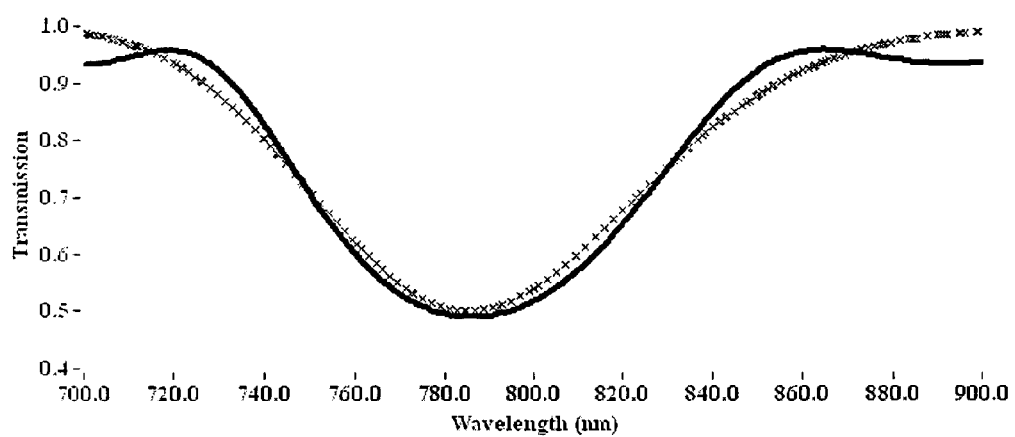
FIG. 5 is a plot showing a theoretical gain-flattening filter designed for the cryo amplifier of FIG. 3, and an actual filter that was built.

FIG. 5 is a plot showing a theoretical gain-flattening filter designed for the cryo amplifier of FIG. 2, and an actual filter 122 that was built. Of course, many variations on this filter structure are possible. For example, many different high index and low index materials might be used.

An actual produced filter 122 was formed in layers on a fused silica substrate. The heavy line is the filter actually made, and the line formed of x's denotes the theoretical desired filter profile. This filter was used to produce the data in FIG. 5. Shown is $HfO_2$, $SiO_2$ (Halfnium dioxide, and Silicon dioxide). Table 1 shows the layer position, and thickness for the $HfO_2/SiO_2$ Design. Note that layer 1 is closest to the substrate

TABLE 1

HfO$_2$/SiO$_2$ filter design used in
measured data (FIG. 5). HfO$_2$/SiO$_2$

| Layer | Material | Thickness (nm) |
| --- | --- | --- |
| 1 | HfO$_2$ | 157.37 |
| 2 | SiO$_2$ | 331.27 |
| 3 | HfO$_2$ | 432.75 |
| 4 | SiO$_2$ | 227.72 |
| 5 | HfO$_2$ | 91.39 |
| 6 | SiO$_2$ | 387.83 |
| 7 | HfO$_2$ | 193.20 |
| 8 | SiO$_2$ | 179.75 |
| 9 | HfO$_2$ | 163.19 | used for high damage threshold applications. Again, layer 1 is the layer closest to the substrate.

TABLE 2

TiO$_2$/SiO$_2$ alternate filter design which
may be used for lower damage threshold applications.

| Layer | Material | Thickness (nm) |
| --- | --- | --- |
| 1 | TiO$_2$ | 153.09 |
| 2 | SiO$_2$ | 320.99 |
| 3 | TiO$_2$ | 368.68 |
| 4 | SiO$_2$ | 247.97 |
| 5 | TiO$_2$ | 82.36 |
| 6 | SiO$_2$ | 368.87 |
| 7 | TiO$_2$ | 167.52 |
| 8 | SiO$_2$ | 195.72 |
| 9 | TiO$_2$ | 148.79 |

Figure 6:
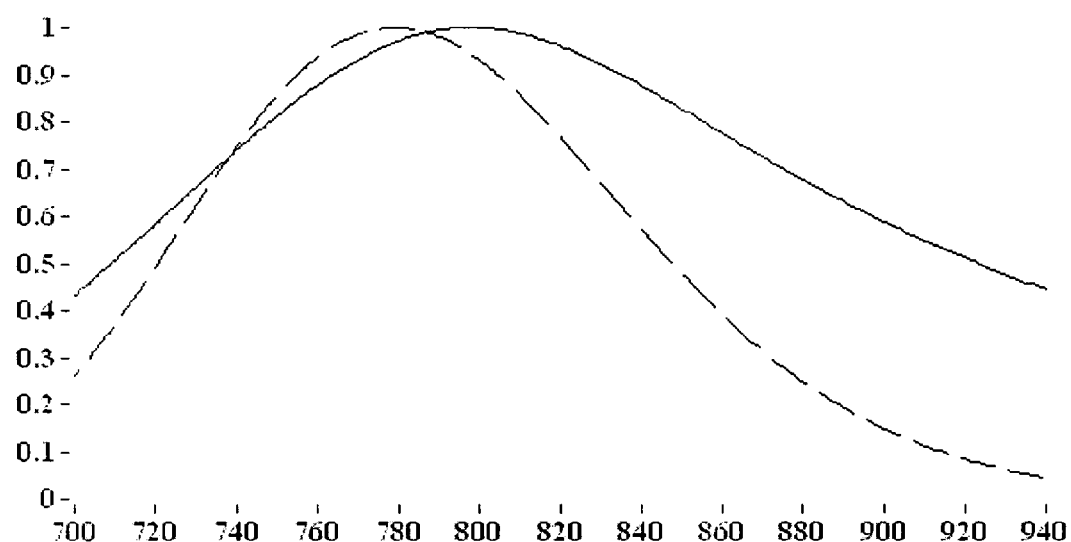
FIG. 6 is a plot showing the effect of changing temperature on pulse spectrum in a ti:sapphire amplifier system.

FIG. 6 (Prior Art) is a plot showing the effect of changing temperature on pulse spectrum in a ti:sapphire amplifier system without a gain flattening filter. The solid line shows the output spectrum of a room temperature (300 K) ti:sapphire amplifier system, while the dashed line shows the output spectrum of a cryogenically cooled (70 K) Ti:sapphire amplifier system. In the cryo cooled system, the gain spectrum is both shifted and narrowed. Since the pulse duration and spectral bandwidth have an inverse relationship, spectral narrowing corresponds to longer-duration pulses, which is generally undesirable. Filter 122 is optimized to adjust for these changes.

Figure 7:
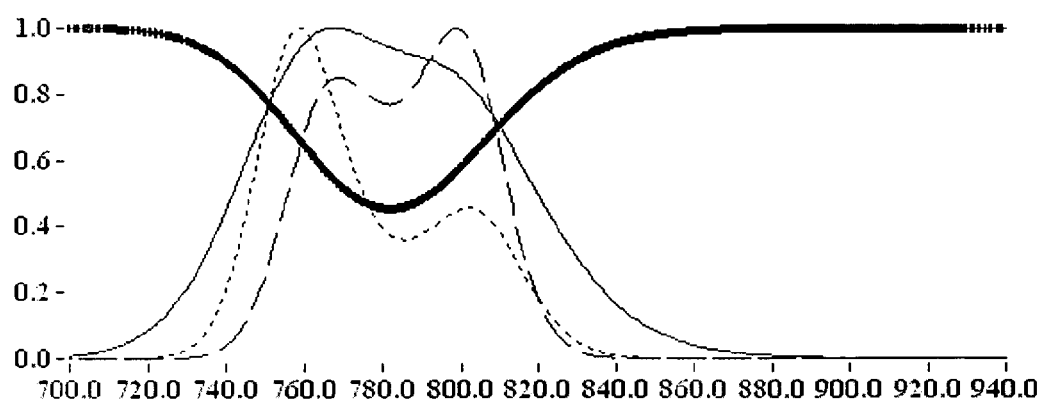
FIG. 7 is a plot illustrating the effect of the gain flattening filter of FIG. 3 on pulse spectrum in a cryo amplifier

FIG. 7 is a plot illustrating the effect of the gain flattening filter of FIG. 3 on pulse spectrum in a cryo amplifier. FIG. 7 is a plot illustrating the effect of the gain flattening filter of FIG. 3 on pulse spectrum (amplification is not shown). Gain flattening filter 122 intersects the first seven passes 128 of cryogenic Ti:sapphire amplifier system 100. The last five passes bypass filter 122. The thick black curve is the filter transmission (ideal) of filter 122, the solid line is the spectrum after the first pass, the short dashed line is the spectrum after the seventh pass, and the long dash is the spectrum of the output pulse 134, after twelve passes (seven intersecting passes 128 and five bypassing passes 126). The output spectrum is 55 nm FWHM which gives a 22 fs pulse assuming no phase distortion (or correction of phase distortion using a variety of pulse shaping techniques). The blue shifted spectrum is caused by a blue shift in the cryogenically cooled amplifier, and a gain spectral narrowing is also observed. This leads to a narrower output spectrum compared to the room temperature case. However, with the cryo cooled amplifier, the thermal lensing is greatly reduced (1 cm@ 300 K, to 5 m@ 70 K), allowing multiple passes through the amplifier without distortion of the beam. This required fine tuning and many runs to adapt the filter design for cryo-cooled amplifiers. The critical parameters are depth, width, and spectral center wavelength. Also the wings of the filter must be <5% modulation. See FIG. 4 and associated text.

Figure 8:
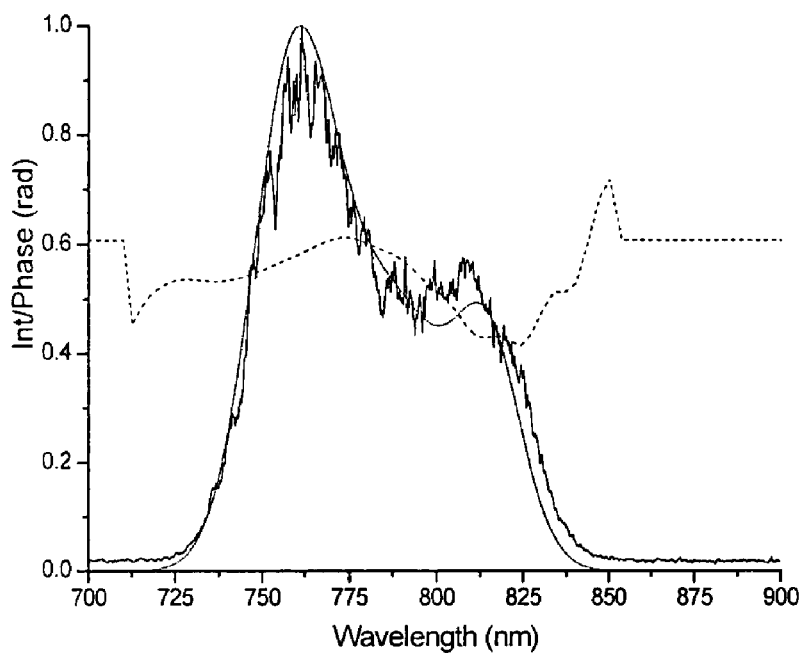
FIG. 8 is a plot illustrating actual measured spectrum data from a cryo cooled amplifier as shown in FIG. 3.

FIG. 8 is a plot illustrating actual measured spectrum data from cryo cooled amplifier 100 as shown in FIG. 3, in this case a 6 mJ, 5 kHz amplifier system. Again gain flattening filter 122 intersects the first seven passes 128 of cryogenic Ti:sapphire amplifier system 100 and the last five passes bypass filter 122. FWHM is 55 nm, giving a 23 fs pulse. The solid (jagged) line is the measured spectrum of output pulse 134. The short dashed line (curved) is calculated spectrum, and dotted line is spectral phase of the pulse. This figures illustrates that actual results closely mirror calculated results, and that the filter does not affect the spectral phase of the system enough to prevent compressing the pulses to a short duration.

Figure 9:
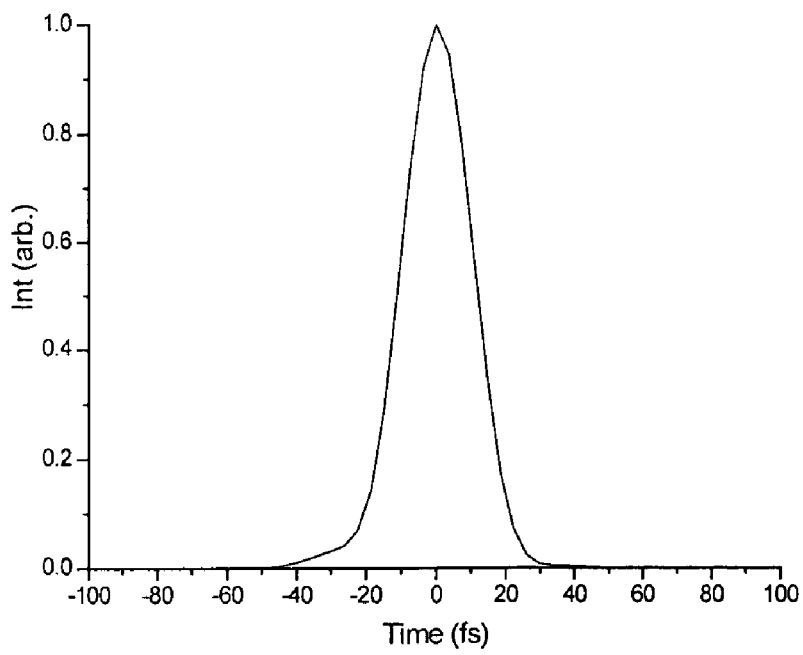
FIG. 9 is a plot showing an actual measured temporal pulse from a cryo cooled amplifier as shown in FIG. 3.

FIG. 9 is a plot showing an actual measured (using frequency resolved optical gating (FROG)) temporal pulse 134 from cryo cooled amplifier 100 as shown in FIGS. 3 and 7. Note the 23 fs FWHM pulse.

While the exemplary preferred embodiments of the present invention are described herein with particularity, those skilled in the art will appreciate various changes, additions, and applications other than those specifically mentioned, which are within the spirit of this invention. For example, variations in the design of the gain flattening filter can produce a similar transmission (or reflection) characteristics. Filters could also be positioned so that for each pass through the laser medium, the beam passes through the filter more than once, with the cumulative effect of the filter reflections (or transmissions) obtaining a similar gain-flattening effect. The function of the filter might be divided into two filters in the system.

What is claimed is:

1. A multipass ultra-short pulse laser amplifier system comprising
   a gain material for amplifying laser pulses,
   means for energizing the gain material,
   means for introducing an input pulse beam;
   mirrors for circulating the pulses around the amplifier several times;
   means for removing a laser pulse from the amplifier; and
   a gain flattening filter for maintaining the spectral bandwidth of the laser pulses,
   wherein the mirrors and the filter are constructed and arranged to cause the laser pulse to pass through the filter for several passes and then to bypass the filter for several passes.

2. The amplifier of claim 1 further comprising a cryogenic chamber for cooling the gain material and wherein the filter is optimized to maintain spectral bandwidth of laser pulses amplified by a cryogenically cooled gain material.

3. The amplifier of claim 2 wherein the cryogenic chamber is adjusted to maintain the laser material at a temperature that improves the performance of the optimized filter.

4. The amplifier of claim 2 wherein the filter comprises:
   a substrate; and
   a plurality of approximately quarter-wave alternating layers of high index and low index materials formed on the substrate;
   wherein the thickness of the layers is optimized to maintain spectral bandwidth of laser pulses amplified at cryogenic temperatures.

5. The amplifier of claim 4 wherein the layers extend to a first edge of the filters, wherein the pulses move off of the filter at the first edge, and further comprising a physically support attached to the filter at a second edge.

6. The amplifier of claim 4 wherein the gain material is Ti:sapphire.

7. The amplifier of claim 6 wherein the filter gain attenuation spectrum is centered at about 770 nm.

8. The amplifier of claim 2 further comprising means to adjust the filter position to change the number of passes through the filter.

9. The amplifier of claim 1 wherein the filter comprises:
a substrate; and
a plurality of approximately quarter-wave alternating layers of high index and low index materials formed on the substrate;
wherein the thickness of the layers is optimized to maintain spectral bandwidth of the pulses.

10. The amplifier of claim 9 wherein the layers extend to a first edge of the filters, wherein the pulses move off of the filter at the first edge, and further comprising a physically support attached to the filter at a second edge.

11. The amplifier of claim 1 wherein the gain material is Ti:sapphire.

12. The amplifier of claim 1 further comprising means to adjust the filter position to change the number of passes through the filter.

13. A method of maintaining spectral bandwidth in an ultra-short pulse laser amplifier having a gain medium comprising the steps of:
energizing the gain medium;
introducing an input pulse beam to the amplifier;
amplifying pulses using the gain medium,
circulating the pulses around the amplifier several times;
maintaining the spectral bandwidth of the laser pulses using a gain flattening filter;
causing the laser pulse to pass through the filter for several passes and then causing the laser pulse to bypass the filter for several passes; and
removing a laser pulse from the amplifier.

14. The method of claim 13, further comprising the steps of:
cooling the gain material to a cryogenic temperature; and
optimizing the filter to maintain spectral bandwidth of laser pulses amplified by a cryogenically cooled gain material.

15. The method of claim 14 wherein the gain material is Ti:sapphire.

16. The method of claim 15 wherein the filter gain attenuation spectrum is centered at about 770 nm.

17. The method of claim 14, further comprising the step of:
adjusting the temperature of the gain medium to improve the performance of the optimized filter.

18. The method of claim 14, further comprising the step of adjusting the position of the filter to change the number of passes through the filter.

19. The method of claim 13, further comprising the step of adjusting the position of the filter to change the number of passes through the filter.

* * * * *

UNITED STATES PATENT AND TRADEMARK OFFICE
CERTIFICATE OF CORRECTION

| | | |
|---|---|---|
| PATENT NO. | : 7,242,520 B2 | Page 1 of 1 |
| APPLICATION NO. | : 11/501206 | |
| DATED | : July 10, 2007 | |
| INVENTOR(S) | : Sterling J. Backus and Henry C. Kapteyn | |

It is certified that error appears in the above-identified patent and that said Letters Patent is hereby corrected as shown below:

Title page, item [57]

Abstract, line 6, delete "position may be adjust" and insert --position may be adjusted--.

Column 1, line 54, after "In later passes, when" insert --the--.

Column 3, line 41, after "cryo amplifier", insert --.--.

Column 5, line 51, delete "a approximately" and insert --an approximately--.

Column 6, line 42, after "reflective mode", insert --.--.

Column 6, line 67, after "the substrate", insert --.--.

Column 8, line 15, delete "figures" and insert --figure--.

Column 9, line 3, delete "physically" and insert --physical--.

Column 9, line 22, delete "physically" and insert --physical--.

Signed and Sealed this

Eighteenth Day of September, 2007

JON W. DUDAS
*Director of the United States Patent and Trademark Office*